United States Patent
Asplund et al.

[11] Patent Number: 5,980,095
[45] Date of Patent: Nov. 9, 1999

[54] PLANT FOR TRANSMITTING ELECTRIC POWER

[75] Inventors: Gunnar Asplund; Kjell Eriksson, both of Ludvika, Sweden

[73] Assignee: Asea Brown Boveri AB, Västerås, Sweden

[21] Appl. No.: 08/938,350

[22] Filed: Sep. 29, 1997

[30] Foreign Application Priority Data

Mar. 24, 1997 [SE] Sweden ................................ 9701060

[51] Int. Cl.$^6$ .................................................. H02M 15/00
[52] U.S. Cl. ........................................ 364/528.21; 702/62
[58] Field of Search ..................................... 364/492, 483, 364/226.9, 528.21; 702/62

[56] References Cited

U.S. PATENT DOCUMENTS

| | | | |
|---|---|---|---|
| 3,916,294 | 10/1975 | Kennedy | 323/275 |
| 3,942,089 | 3/1976 | Kanngiesser | 363/27 |
| 4,274,043 | 6/1981 | Heitz | 320/117 |
| 4,633,162 | 12/1986 | Melbert | 323/275 |
| 4,941,079 | 7/1990 | Ooi | 363/132 |
| 5,166,957 | 11/1992 | Lenoir | 357/257 |
| 5,341,265 | 8/1994 | Westrom et al. | 361/44 |
| 5,414,612 | 5/1995 | Bjorklund et al. | 363/35 |
| 5,535,113 | 7/1996 | Konishi | 363/35 |
| 5,539,654 | 7/1996 | Aberg | 364/528.33 |
| 5,544,665 | 8/1996 | Litovitz et al. | 128/897 |
| 5,642,249 | 6/1997 | Kuznetsov | 361/58 |

FOREIGN PATENT DOCUMENTS

| | | |
|---|---|---|
| 504 522 | 2/1997 | Sweden . |
| WO 97/02639 | 1/1997 | WIPO . |

OTHER PUBLICATIONS

Kjeld Thorborg, Power Electronics, 1993, Student litteratur; Chartwell–Bratt Ltd. (Lund), chapter 7.1, 7.2.

*Primary Examiner*—William Grant
*Assistant Examiner*—Iván Calaño
*Attorney, Agent, or Firm*—Pollock, Vande Sande & Amernick

[57] ABSTRACT

A plant for transmitting electric power is provided. The plant has a direct voltage network connected to at least one alternating voltage network through a station. The station transmits electric power between the direct voltage network and the alternative voltage network and has at least one converter for converting direct voltage to alternating voltage and for converting alternating voltage to direct voltage. The plant comprises a DC/DC converter connected between the poles of the direct voltage network. The DC/DC converter is adapted to create a higher voltage between the poles on the station remote side of the DC/DC converter than on the station near side.

7 Claims, 2 Drawing Sheets

PLANT FOR TRANSMITTING ELECTRIC POWER

BACKGROUND OF THE INVENTION

The present invention relates to a plant for transmitting electric power comprising a direct voltage network for High Voltage Direct Current (HVDC) and at least one alternating voltage network connected thereto through a station. The station has at least one VSC-converter adapted to convert direct voltage into alternating voltage and the converse, and for transmitting electric power between the direct voltage network and the alternating voltage network.

Such a plant has recently become known through the thesis "PWM and Control of Two and Three Level High Power Voltage Source Converters" by Anders Lindberg, Kungliga Tekniska Högskolan, Stockholm, 1995, in which publication such a plant for transmitting electric power through a direct voltage network for HVDC is described. Before the issuance of the thesis, plants for transmitting electric power through a direct voltage network for HVDC have been based upon the use of line-commutated CSC (Current Source Converter) converters in stations for power transmission. By the development of IGBTs (Insulated Gate Bipolar Transistor; a bipolar transistor having an insulated gate) for high voltage applications, and the suitability to connect them in series in valves in converters, since they may easily be turned on and turned off simultaneously, VSC (Voltage Source Converter) converters for forced commutation have now become an alternative. This type of transmission of electric power between a direct voltage network for HVDC, being voltage-stiff therethrough, and alternating voltage networks connected thereto, offers several important advantages with respect to the use of line-commutated CSCs in HVDC. Thus, the consumption of active and reactive power may be controlled independently of each other, and there is no risk of commutation failures in the converter, and thereby no risk of transmission of commutation failures between different HVDC links, which may occur in line-commutation. Furthermore, there is the possibility to feed a weak alternating voltage network or a network without any generator of its own (a dead alternating voltage network). Further advantages are also provided.

In a plant of this type, it is desirable to operate without expensive transformers and still obtain the exact voltage asked for on the direct voltage network.

SUMMARY OF THE INVENTION

The object of the present invention is obtained in such a plant on the direct voltage side of the station by connecting a DC/DC-converter between the poles of the direct voltage network and arranging it to create a higher voltage between the poles of the direct voltage network on the station remote side of this converter than on the station near side thereof.

By such an arrangement of a DC/DC-converter, voltage adaption of the direct voltage network may take place without using expensive transformers. The converter functions towards the direct voltage network as a so called "step-up-converter" for raising the voltage level while, in a corresponding way, it may be used to take the voltage level down, i.e., function as a so-called "step-down-converter", when the station functions as a receiving station. This arrangement also provides that the entire direct voltage of the direct voltage network is not applied to the current valves of the VSC-converter, so that these do not have to hold a voltage equal to the entire direct voltage, and may therefore be made of a smaller number of power semiconductor devices connected in series, thereby saving further costs.

It should be noted that the phrase "the poles of the direct voltage network" is to be given wide meaning and comprises the case when one pole of the direct voltage network is formed by ground and the other pole is on negative or positive potential, and the case in which the poles of the direct voltage network are on positive and negative potential.

According to a preferred embodiment of the invention, the DC/DC-converter comprises a first capacitor, defining the direct voltage on the station near side of this converter, connected between the two poles of the direct voltage network. An inductance is connected in the positive pole conductor of the direct voltage network between the station remote side of the capacitor and a midpoint in a bridge on the station remote side formed by two current valves which are connected between the poles of the direct voltage network. A second capacitor is connected in parallel with the bridge on the station remote side thereof for defining the voltage between the poles of the direct voltage network on the side last mentioned of the converter. Means is adapted to alternatingly make the current valves conductive so as to through the relationship between the time periods of conducting determine the relationship between the direct voltages across the two capacitors. Through an arrangement of such a DC/DC-converter for voltage adaption instead of a transformer, a considerable saving of costs may be achieved.

According to another preferred embodiment of the invention, the means are adjustable as to the time periods of conducting so as to, by a choice thereof, enable regulation of the relationship between the voltages across the two capacitors. An optimum voltage adaption according to the prevailing conditions will be possible in this way.

According to another preferred embodiment of the invention, the alternating voltage network connected to the station has a plurality of phases. This is normally the case, in which the number of phases normally is three. An arrangement of a DC/DC-converter in the way according to the invention means that the current valves of the VSC-converter do not have to take the entire voltage of the direct voltage network on the station remote side of the converter, and these valves may be made of a smaller number of power semiconductor devices connected in series. This results in a saving of the number of such power semiconductor devices necessary in the plant in the case of a plurality of phases, since the VSC-converter has two current valves per phase of the alternating voltage network. In the case of two current valves in the DC/DC-converter and a three-phase alternating voltage network connected to the VSC-converter, only the two current valves of the DC/DC-converter have to be dimensioned to hold the entire direct voltage instead of the six current valves of the VSC-converter, which would be the case if the plant did not have any DC/DC-converter.

Further advantages as well as advantageous features of the invention will appear from the following description.

BRIEF DESCRIPTION OF THE DRAWINGS

With reference to the appended drawings, a description of a preferred embodiments of the invention are cited as examples.

In the drawings.

DETAILED DESCRIPTION OF PREFERRED EMBODIMENTS OF THE INVENTION

Figure 1:
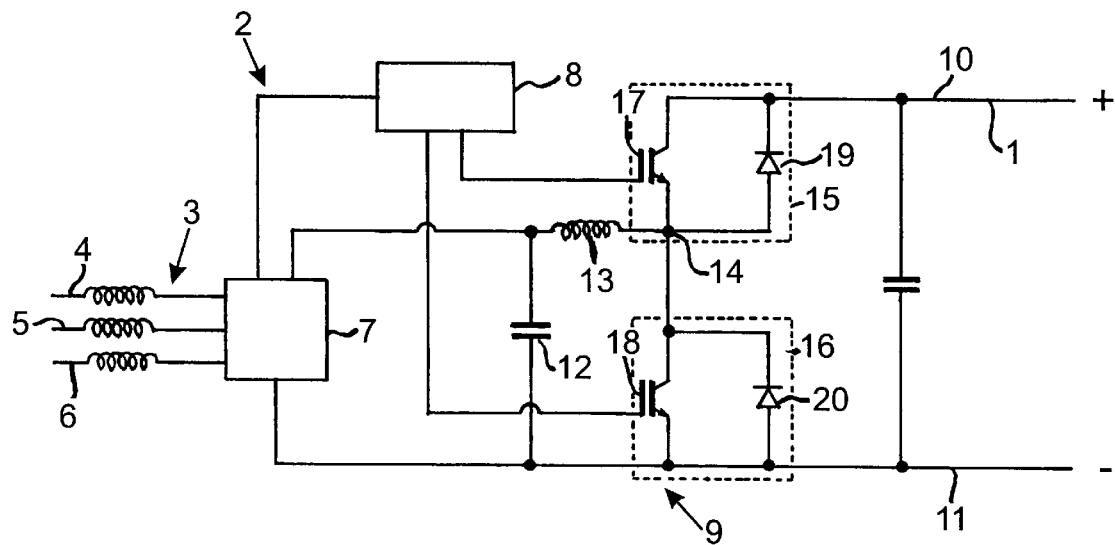
FIG. 1 is a schematic diagram according to a first embodiment of the invention illustrating the principles of the invention.

The structure of a plant for transmitting electric power according to the invention is schematically illustrated in FIG. 1, in which only the components having something directly to do with the function according to the invention have been shown in the drawing for facilitating the comprehension of the invention. The plant comprises a direct voltage network 1 for HVDC, and an alternating voltage network 3 connected thereto through a station 2 which, in the present case, has three phases 4, 5 and 6. The station is adapted to perform transmission of electric power between the direct voltage network 1 and the alternating voltage network 3, in which the power may be fed from the alternating voltage network to the direct voltage network, or fed out from the direct voltage network to the alternating voltage network. Thus, the alternating voltage network may have generators of electric power or only be connected to consumers thereof.

The station comprises at least one VSC-converter 7 adapted to convert direct voltage into alternating voltage and conversely. However, it is possible that the station comprises a plurality of such converters, but these are, in the present case, summarized through a single box. The VSC-converter comprises, in a conventional way, so-called current valves, which consist of branches of breakers of turn-on and turn-off type connected in series, preferably in the form of IGBTs, and diodes connected in anti-parallel therewith. A great number of IGBTs may be connected in series in a single valve so as to be turned on and turned off simultaneously so as to function as a single breaker, whereby the voltage across the valve is distributed among the different breakers connected in series. The control of the breakers is performed by pulse width modulation (PWM). The station further comprises an apparatus 8 schematically indicated for controlling the converter 7 to achieve the modulation.

Furthermore, a DC/DC-converter 9 is connected between the poles 10, 11 of the direct voltage network on the direct voltage side of the station. This converter comprises: a first capacitor 12 defining the direct voltage network $U_1$ on the station near side of this converter and connected between the two poles of the direct voltage network, and inductor 13 connected in the positive pole conductor 10 of the direct voltage network on the station remote side of the capacitor and on the station remote side to a mid point 14 in a bridge formed by current valves 15, 16 connected in series between the poles of the direct voltage network, and a second capacitor is connected in parallel with the bridge on the station remote side thereof for defining the voltage $U_2$ between the poles of the direct voltage network on the side last-mentioned on the latter converter. The current valves 15, 16 are, in a conventional way, formed by a series connection of an amount of power semiconductor devices 17, 18 of turn-off type, such as IGBTs, and rectifying diodes 19, 20 connected in anti-parallel therewith. These are here summarized by one single power semiconductor device and diode per current valve.

The control apparatus 8 also has means for alternatingly turning the two power semiconductor devices 17, 18 on to make the current valves 15, 16 alternatingly conducting. As a result, the relationship between the time periods of conduction determines the relationship between the direct voltage $U_1$ and $U_2$ for the two capacitors. How this takes place will now be explained with reference to FIG. 2.

Figure 2:
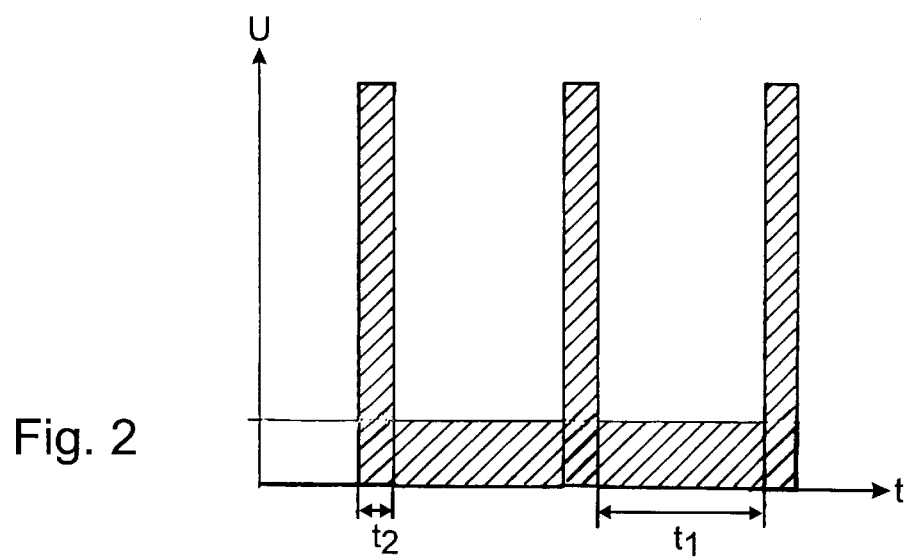
FIG. 2 is a graph illustrating the voltage across the inductance of the DC/DC-converter in FIG. 1 versus the time.

The DC/DC-converter has two intervals, a first interval during which the current valve 16 conducts over the time $t_1$, and a second interval during which the current valve 15 conducts over time $t_2$ (see FIG. 2). Point 14 is, during the first interval, on the same potential as pole 11 of the direct voltage network. As a result, the voltage $U_1$ is applied across the inductance 13, and the current through the inductance increases linearly. When the valve 16 is turned off and the valve 15 is turned on, the point 14 will arrive at the potential $U_2$ which means that the voltage across the inductor 13 will now be $U_1-U_2$, so that the current through the inductor 13 will decrease. The relationship between $U_1$ and $U_2$ may be calculated by studying the voltage across the inductor 13, which, in balance, has to be a pure alternating voltage. The following is valid:

$$U_1 \cdot t_1 = (U_2 - U_1) \cdot t_2, \text{ i.e.,}$$

$$U_2 = U_1 \cdot t_1 + t_2 / t_2$$

Thus, a higher voltage $U_2$ may in this way be obtained on the direct voltage network on the station remote side of the DC/DC-converter than the voltage $U_1$ across the poles of the direct voltage network on the station near side of the DC/DC-converter. The voltage increase may be controlled by regulating the relationship between the time periods of conduction of the current valves 15, 16. By suitably controlling these time periods of conduction, a desired voltage adaption may take place in the direct voltage network. A comparatively low voltage $U_1$ may exist across the VSC-converter, and thereby a small number of power semiconductor devices connected in series may be used in the current valves thereof and the voltage will still be transformed to a higher desired level $U_2$ without an expensive transformer. Only the two valves 15, 16 then have to hold the total voltage $U_2$ of the direct voltage network.

Figure 3:
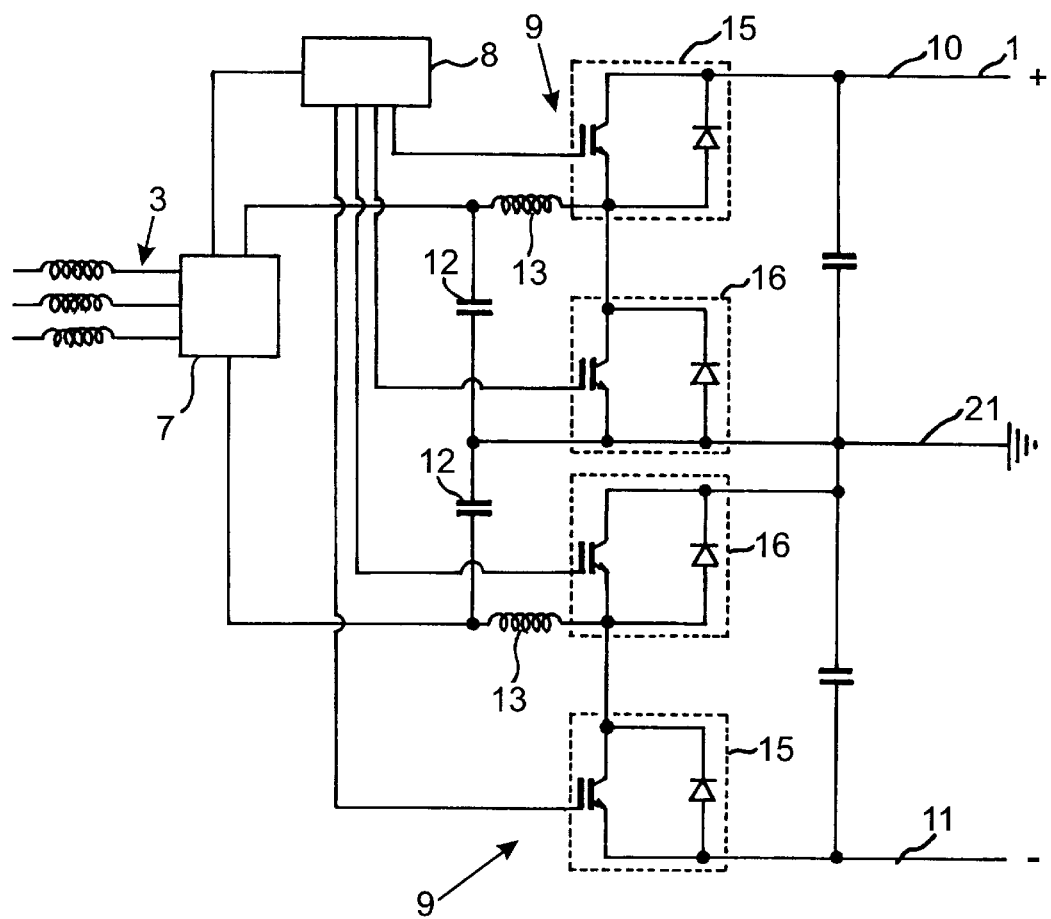
FIG. 3 is a diagram corresponding to FIG. 1 of a second embodiment of the invention.

A variant to the plant according to FIG. 1 is shown in FIG. 3 which functions according to the same principle as described above, but in which a DC/DC-converter is adapted to convert the voltage between ground potential and the positive pole of the direct voltage network, and another to convert the voltage between ground potential and the negative pole of the direct voltage network. These conversions may, in this way, be controlled separately.

The invention is of course not in any way restricted to the embodiment described above, and many possible modifications thereof would be apparent to one skilled in the art without departing from the basic idea of the invention, such as is defined in the claims. The connections to the pole conductor 11 could, for example, as already mentioned, be replaced by ground connection. It is also possible to position the DC/DC-converter at a significant distance from a station, should this be desired for any reason.

What is claimed is:

1. An HVDC plant for transmitting electric power having a direct voltage network connected to at least one alternating voltage network through a station, said station transmitting electric power between said direct voltage network and said alternating voltage network and having at least one converter for converting direct voltage to alternating voltage and the converse, said HVDC plant comprising:

a DC/DC converter connected between poles of said direct voltage network, said DC/DC converter being adapted to create a higher voltage between the poles on the station remote side of said DC/DC converter than on the station near side wherein said DC/DC converter comprises:

a first capacitor connected between the two poles of the direct voltage network;

an inductor connected in the positive pole conductor of said direct voltage network between the station remote side of said first capacitor and a midpoint of a bridge formed by two current valves connected between the poles of said direct voltage network;

a second capacitor connected in parallel with said bridge on the station remote side of said bridge; and means for alternatingly making said current valves conducting whereby the relationship between the conducting periods determines the relationship between the direct voltages across said first and second capacitors.

2. The plant according to claim 1 wherein said means is adjustable to control said conduction periods according to a predetermined time.

3. The plant according to claim 1 wherein said alternating voltage has a plurality of phases.

4. The plant according to claim 1 wherein said alternating voltage network has three phases.

5. The plant according to claim 1 wherein each said current valve comprises at least one power semiconductor of a turn-off type and a diode connected in anti-parallel with said power semiconductor.

6. The plant according to claim 1 wherein one pole of said direct voltage network is formed by ground.

7. The plant according to claim 1 wherein one pole is formed by a conductor on negative potential.

* * * * *